(12) United States Patent
Soma et al.

(10) Patent No.: US 12,078,851 B2
(45) Date of Patent: Sep. 3, 2024

(54) OPTICAL MODULE

(71) Applicant: Nippon Telegraph and Telephone Corporation, Tokyo (JP)

(72) Inventors: Shunichi Soma, Musashino (JP); Yusuke Nasu, Musashino (JP); Ken Tsuzuki, Musashino (JP); Takashi Yamada, Musashino (JP); Kiyofumi Kikuchi, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 267 days.

(21) Appl. No.: 17/602,198

(22) PCT Filed: Apr. 16, 2020

(86) PCT No.: PCT/JP2020/016786
§ 371 (c)(1),
(2) Date: Oct. 7, 2021

(87) PCT Pub. No.: WO2020/218171
PCT Pub. Date: Oct. 29, 2020

(65) Prior Publication Data
US 2022/0214508 A1 Jul. 7, 2022

(30) Foreign Application Priority Data

Apr. 24, 2019 (JP) .................................. 2019-082870

(51) Int. Cl.
*H04B 10/00* (2013.01)
*G02B 6/12* (2006.01)
(Continued)

(52) U.S. Cl.
CPC ................. *G02B 6/42* (2013.01); *G02B 6/12* (2013.01); *G02B 6/26* (2013.01); *G02B 6/3636* (2013.01)

(58) Field of Classification Search
CPC ... G02B 6/42; G02B 6/12; G02B 6/26; G02B 6/3636; G02B 6/4201; G02B 6/4206
See application file for complete search history.

(56) References Cited

U.S. PATENT DOCUMENTS

| | | | | |
|---|---|---|---|---|
| 5,444,804 A | * | 8/1995 | Yui | G02B 6/30 385/98 |
| 5,812,716 A | * | 9/1998 | Ohishi | H01S 5/141 385/37 |

(Continued)

FOREIGN PATENT DOCUMENTS

| | | |
|---|---|---|
| JP | 2001-141953 A | 5/2001 |
| JP | 2002-341160 A | 11/2002 |

(Continued)

*Primary Examiner* — Agustin Bello
(74) *Attorney, Agent, or Firm* — Workman Nydegger (57) ABSTRACT

In a pipe structure in which an optical fiber passes, miniaturization of the optical module in the longitudinal direction of the optical fiber is prevented. In the optical module according to the present invention, a holding structure of the optical fiber necessary to adopt the pipe structure is moved to a cover extension unit of the package. The optical fiber is adhered and fixed to the cover extension unit protruding from the cover body unit of the package to ensure protection of the optical fiber, and the optical waveguide chip is disposed to be closer to an inner wall of a side surface of the package. By disposing the optical waveguide chip to be close to the inner wall of the package as much as possible and reducing the mounting area in the package to the utmost, it is possible to realize miniaturization of the entire optical module.

8 Claims, 6 Drawing Sheets

(51) Int. Cl.
*G02B 6/26* (2006.01)
*G02B 6/36* (2006.01)
*G02B 6/42* (2006.01)

(56) References Cited

U.S. PATENT DOCUMENTS

| | | | |
|---|---|---|---|
| 5,999,674 A * | 12/1999 | Yui | G02B 6/30 |
| | | | 385/99 |
| 6,317,964 B1 * | 11/2001 | Robertsson | G02B 6/42 |
| | | | 29/601 |
| 7,050,678 B1 * | 5/2006 | Isono | G02B 6/4255 |
| | | | 385/39 |
| 7,572,070 B2 * | 8/2009 | Sasaki | G02B 6/30 |
| | | | 385/94 |
| 9,116,308 B2 * | 8/2015 | Huang | G02B 6/3807 |
| 10,191,236 B2 * | 1/2019 | Yeh | G02B 6/30 |
| 2002/0191922 A1 | 12/2002 | Goto et al. | |
| 2006/0104575 A1 * | 5/2006 | Ikeda | G02B 6/4266 |
| | | | 385/88 |
| 2007/0280603 A1 * | 12/2007 | Sakata | H01R 13/6594 |
| | | | 385/88 |
| 2012/0027346 A1 * | 2/2012 | Castagna | G02B 6/4206 |
| | | | 385/33 |
| 2013/0294731 A1 * | 11/2013 | Van Der Mee | G02B 6/4284 |
| | | | 385/76 |
| 2015/0255635 A1 * | 9/2015 | Hsiao | G02B 6/4244 |
| | | | 257/723 |
| 2016/0085034 A1 * | 3/2016 | Butler | G02B 6/4214 |
| | | | 385/79 |
| 2018/0224616 A1 * | 8/2018 | Yeh | G02B 6/3839 |
| 2018/0267255 A1 * | 9/2018 | Butler | G02B 6/3885 |
| 2019/0384005 A1 * | 12/2019 | Brusberg | G02B 6/262 |
| 2022/0214508 A1 * | 7/2022 | Soma | G02B 6/12 |

FOREIGN PATENT DOCUMENTS

| | | |
|---|---|---|
| JP | 2005-49816 A | 2/2005 |
| JP | 2011-107444 A | 6/2011 |
| JP | 62-91451 B2 | 2/2018 |
| WO | 2003/079086 A1 | 9/2003 |

* cited by examiner

OPTICAL MODULE

BACKGROUND ART

The present invention relates to a configuration of an optical module including an optical fiber.

With the explosive spread of portable terminals typified by smartphones and substantial video delivery services, the demand for increase in transmission capacity of optical networks is increasing day by day. Further development in optical communication technologies is required to meet this demand and technologies for miniaturizing components and reducing the cost of components used for optical communication systems is becoming more and more important. Optical waveguide-type devices can be exemplified as a technology important for realizing components for the optical communication systems. Various basic functions such as functions of an optical signal brancher/coupler, a wavelength multiplexer/demultiplexer, an interleaving filter, an optical switch, and a variable optical attenuator (VOA) have been realized by applying the light interference principle. Because optical waveguide-type devices can be disposed freely on planes, circuit design is flexible and large scalability and high integration are easy. Because optical waveguide-type devices are manufactured using semiconductor component manufacturing processes such as those for an LSI, excellent mass productivity of the devices have been achieved. Optical waveguide portions are formed of materials such as semiconductors, high polymer materials, and silicon, and various optical waveguide-type devices have been practically applied.

In order to meet the above-described demand for increasing the transmission capacity of the optical networks, it is necessary to realize miniaturization of the components of optical communication systems. Therefore, there is demand for further reduction in the spaces taken for mounting optical elements such as optical fibers or optical waveguide chips. Of the components of the optical communication systems, general mounting forms in which optical waveguide chips are used are called optical modules.

Figure 1A:
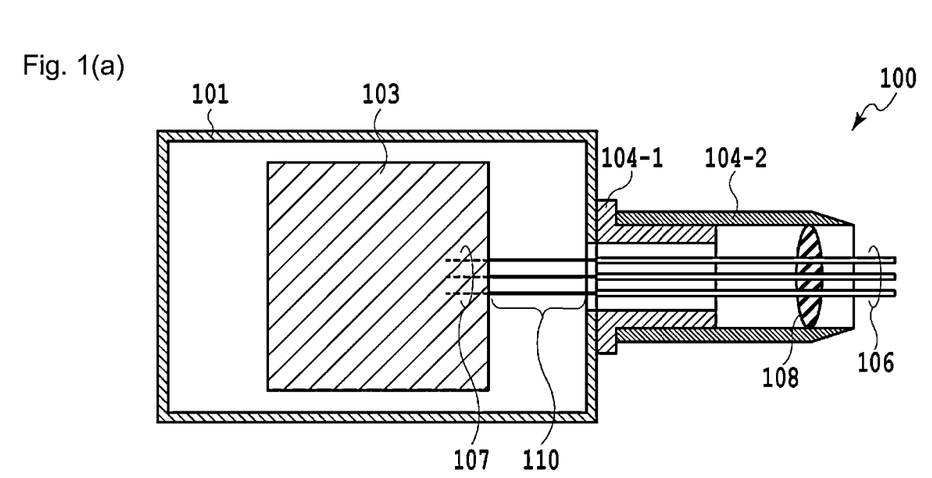
FIGS. 1(a)-1(c) are diagrams illustrating a configuration example of an optical module according to a technology of the related art.
Figure 1B:
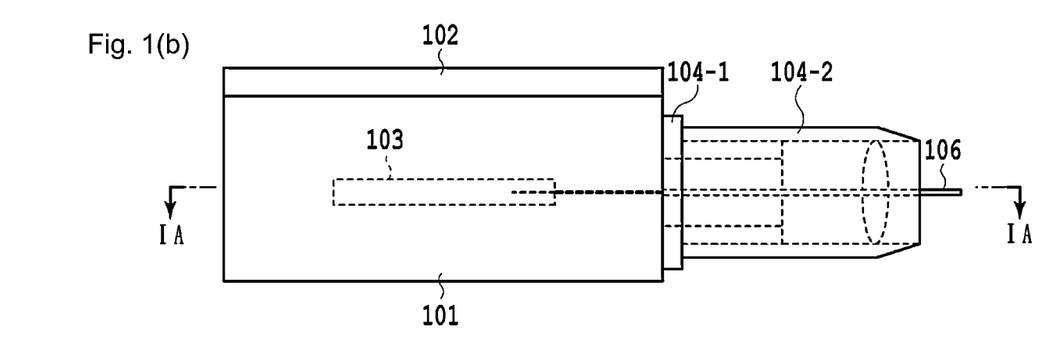
Figure 1C:
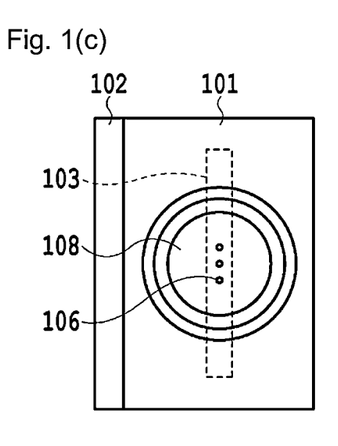

FIG. 1 is a diagram illustrating a configuration example of an optical module of a technology of the related art. FIGS. 1(a), 1(b), and 1(c) are a top view and two side views of an optical module 100. FIG. 1(a) is a top view, as viewed from above, of the optical module with a cover removed, and indicates a cross-section of the side view of FIG. 1(c) when a section immediately above an optical waveguide chip 103 is cut along line IA-IA. In the optical module 100, the optical waveguide chip 103 and other optical elements are stored in a package, and optical fibers 106 are pulled out from the inside of the optical module. The package includes, for example, a boxlike base 101 that does not have an upper surface and a cover 102. A plurality of the optical fibers 106 for inputting and outputting optical signals is pulled out from the inside to the outside of the package through tubular pipes 104-1 and 104-2 which have cylindrical or polygonal cross-sections.

Normally, the pipes are integrated with the base 101 of the package or the pipes 104-1 and 104-2 processed as separate components as in FIG. 1 are mounted in the base 101. The pipes can be formed of the same material as the base 101, for example, a metal. Further, the pipes may be formed of an elastic material such as rubber in order to prevent fiber disconnection. Further, as in the configuration example illustrated in FIG. 1, a combination of the pipe 104-1 formed of a metal and the pipe 104-2 formed of rubber is used in some cases. The optical fibers 106 are fixed by a fixing material 108 such as an adhesive inside the pipe 104-2. Inside the optical module, the optical fibers 106 are optically connected to an optical waveguide 107 with cladding being removed at an end surface of the optical waveguide chip 103.

The reason why the pipes are used in the optical module 100 as described above is that hermetic sealing can be realized in the pipes using a resin material or a metal material such as a solder. Stress generated in the optical fibers 106 upon handling the optical module 100 can also be alleviated by the pipes, or the optical fibers or the internal optical elements can also be protected. Further, when a lens and a spatial optical system component are optically connected to an optical waveguide, a pipe is generally used to maintain the lens and related components inside the pipe.

CITATION LIST

Patent Literature

PTL 1: Japanese Patent No. 6291451

SUMMARY OF THE INVENTION

Technical Problem

However, a configuration of an optical module in which a pipe structure is used does not sufficiently meet the latest demand for miniaturizing an optical device. In the optical module, a necessary mounting area is forced to be considerably reduced. For example, in a transceiver optical module of the latest quad small form-factor pluggable double density (QSFP-DD) standard, downsizing about 10 mm square is required. It is necessary to realize a simpler mounting structure by downsizing a package of an optical module while maintaining constant protection of optical fibers.

In the configuration in which the optical fibers are pulled in the pipe structure described in FIG. 1, it is necessary to provide a structure for holding the optical fibers or lenses and a structure for realizing hermetic sealing. Accordingly, it is necessary to provide a structure for holding the optical fibers and lenses between an end surface of the optical waveguide chip 103 and a side surface of the pipe in the base 101. It is also necessary to provide a mounting space for optically connecting the optical fibers to an end surface of the optical waveguide of the optical waveguide chip 103 inside the package with the optical fibers 106 passing through the pipes in advance and a work space for working. As illustrated in FIG. 1, because a sufficient distance 110 has to be secured along the optical fibers because of a pipe structure through which optical fibers and through which the optical fibers pass, miniaturization of the optical module in a longitudinal direction of the optical fibers is inhibited.

The present invention has been made in view of such problems and an objective of the present invention is to provide a further miniaturized mounting form in an optical module.

Means for Solving the Problem

To achieve the objective of the present invention, an optical module according to a first embodiment of the present invention mounts an optical waveguide chip and includes an optical fiber coupled to the optical waveguide chip, and the optical module includes is stored in a package including a base on which the optical waveguide chip is mounted, and a cover including a cover body unit that covers the entire base, and a cover extension unit that is continuously formed in a direction in which the optical fiber is pulled out from the cover body unit and the optical fiber is adhered and fixed to a surface of the cover extension unit.

In the above-described embodiment, the optical waveguide chip may be mounted on the base such that an end surface of an optical waveguide connected to the optical fiber is close to an inner wall of a side surface of the package.

In the above-described first embodiment, the cover extension unit may be a plate-shaped protrusion continuously formed in the direction in which the optical fiber is pulled out from an upper surface of the cover body unit, and the optical fiber may be pulled out from an opening opened toward the protrusion from an inside of the package. One example of the embodiment corresponds to an optical module according to a first embodiment.

In the above-described embodiment, the cover extension unit may be a substantially U-shaped protrusion formed by three surfaces continuously formed from an upper surface of the cover body unit and a side surface from which the optical fiber is pulled out, and the optical fiber may be pulled out from an opening opened toward the protrusion from an inside of the package. One example of the embodiment corresponds to an optical module according to a second embodiment.

Further, in the above-described embodiments, in the optical module according to claim 1 or 2, the cover extension unit may be at least one plate-shaped protrusion continuously formed from a side surface of the cover body unit from which the optical fiber is pulled out, and the optical fiber may be pulled out from an opening opened toward the protrusion from an inside of the package.

In the above-described embodiments, the optical fiber may be connected such that a mounting angle is equal to or greater than 95 degrees and equal to or less than 105 degrees with respect to a side surface pulled out from the package. One example of the embodiment corresponds to an optical module according to the second embodiment.

In the above-described embodiments, the optical fiber may be fixed inside a glass block and is connected to an end surface of the optical waveguide of the optical waveguide chip, and the glass block may be covered by the cover.

In the above-described embodiments, the optical module may be an optical transceiver module in which an optical transmitter and an optical receiver are integrated, and the number of optical fibers may be three to eight.

Effects of the Invention

As described above, the present invention provides a further miniaturized mounting form.

DESCRIPTION OF EMBODIMENTS

In the configuration of an optical module according to the present invention, while maintaining protection of the optical fibers to some extent, a mounting area of optical fibers can be considerably reduced compared to the technology of the related art, and thus the optical module can be further miniaturized. In the optical module according to the present invention, a structure for holding the optical fibers necessary to adopt a pipe structure in the technology of the related art can be moved to a cover extension unit of a package. The optical fibers can be adhered and fixed to the cover extension unit protruding from a cover body unit of the package to ensure protection of the optical fibers, and the optical waveguide chip can be disposed to be close to an inner wall of a package side surface. By disposing the optical waveguide chip to be close to the inner wall of the package as much as possible, it is possible to realize miniaturization of the entire optical module by reducing a mounting area inside the package as much as possible. The optical module according to the present invention can be widely applied to a form in which the optical fibers are pulled out from the side surface of the optical module. Accordingly, functions realized by the optical module according to the present invention are not limited.

Hereinafter, various embodiments of the present invention will be described with reference to the drawings. In the following embodiments, a silicon photonics optical waveguide chip formed on a silicon on insulator (SOI) substrate will be described as an example. An example in which a package base formed on a ceramic substrate and a cover formed of a metal material are used as a package (casing) of an optical module will be described. This configuration is an example of a material generally used for an optical module and includes a configuration in which a silica-based glass, a high polymer material, or an optical semiconductor is used for other optical waveguide chips. The package base includes a metal substrate, a printed substrate, and a flexible substrate. The cover may be a cover formed of a metal material, and may be a cover formed of a plastic material or a composite thereof. The configuration of the optical module according to the present invention can be applied to any combination of the above-described materials of the optical waveguide chip, the package base, and the cover, and the present invention is not limited to the examples of the following embodiments.

First Embodiment

Figure 2A:
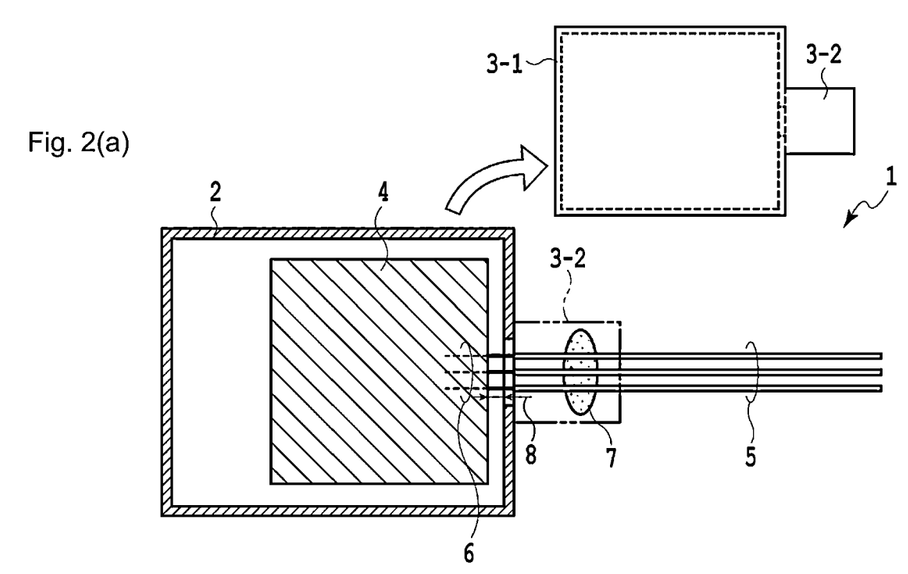
FIGS. 2(a)-2(c) are diagrams illustrating a configuration of an optical module according to a first embodiment of the present invention.
Figure 2B:
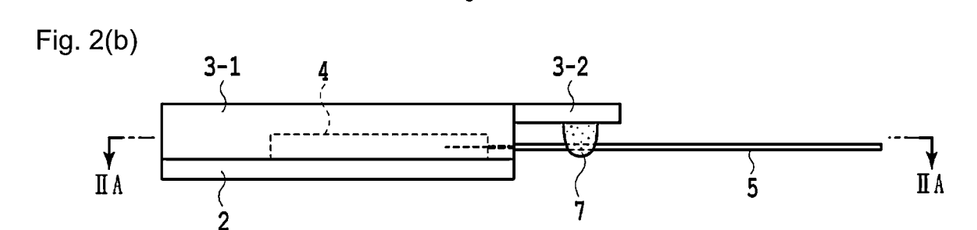
Figure 2C:
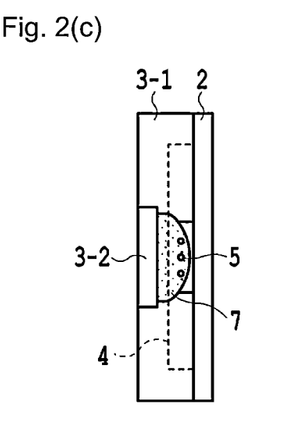

FIG. 2 is a diagram illustrating a configuration of an optical module according to a first embodiment of the present invention. FIGS. 2(a), 2(b), and 2(c) are a top view and two side views of an optical module 1. FIG. 2(a) is a top view, as viewed from above, of the inside of the optical module 1 with a cover 3-1 removed, and indicates a cross-section of the side view of FIG. 2(c) when a section immediately above an optical waveguide chip 4 is cut along line IIA-IIA. Note that, in each drawing of FIGS. 2(a) to 2(c), the structure of the optical module is illustrated without following a drawing method precisely, and for example, parts are indicated by dotted lines although the parts can be actually seen. The optical module 1 includes optical fibers 5, an optical waveguide chip 4, and a package (casing) that stores the optical fibers 5 and the optical waveguide chip 4. The package includes a base (substrate) 2 on which the optical waveguide chip 4 is mounted and a cover body unit 3-1 which covers the entire base 2.

The optical module 1 can have various functions. A light source can be realized by a laser element such as an optical semiconductor, an optical modulator can be realized by an optical modulation element using the electrooptic effect, or an optical receiver can be realized by a light-receiving element such as a photodiode. By combining and integrating these functions, it is possible to realize a composite integrated device. The realized functions are not directly related to a mounting configuration of the optical module according to the present invention. Essential constituent elements in the present invention are the optical fiber, the optical waveguide chip, and the package. Other elements will be omitted or simply described in the following embodiments.

In the optical module 1, three optical fibers 5 are optically connected to the end surface of an optical waveguide of an of the optical waveguide chip 4. The number of optical fibers is exemplary and may be one or any number as long as the optical fibers can be mounted. The optical waveguide chip 4 is mounted on the upper surface of the base 2 included in the package. The cover body unit 3-1 that covers the entire optical module is fitted on the base 2 of the package and the cover body unit 3-1 is a box shape that has side surfaces in four sides of the upper surface. In the configuration of FIG. 2, the base 2 has a plate shape and the side surfaces of the entire optical module 1 are attached to the cover body unit 3-1 in the description. The base 2 may have a shape including a part of a side surface of the optical module as long as a cover extension unit 3-2 holding and fixing the optical fibers to be described below can be formed. The optical waveguide chip 4 includes an optical waveguide 6 therein and the surface of the optical waveguide chip 4 is disposed to be close to an inner wall of the cover side surface on the input and output unit of the optical fibers. In the optical module 1 according to the embodiment, a distance 8 between the inner wall of the cover side surface and the end surface of the optical waveguide chip 4 can be set to a distance equal to or less than 0.5 mm. From viewpoint of miniaturization of the optical module, the distance 8 between the chip end surface and the inner wall of the cover side surface is preferably in the range of 0.1 mm to 0.5 mm. The configuration of the optical module in which the chip end surface and the inner wall of the cover side surface are disposed as close as possible is realized by the cover extension unit through which the optical fibers are input and output to hold and fix the optical fibers, as will be described below.

The cover includes a cover extension unit 3-2 integrated with the body unit 3-1 in addition to the cover body unit 3-1 that has a rectangular upper surface corresponding to the bottom surface of the optical module 1, that is, the base 2. The upper surface of the cover body unit 3-1 protrudes like a hood (an eave) from the side on which the optical fibers 5 are input and output and the upper surface of the cover body unit 3-1 extends to form the cover extension unit 3-2. Accordingly, in the cover that covers the entire optical module 1, the cover body unit 3-1 and the extension unit 3-2 are integrated, as illustrated in FIG. 2(a). As illustrated in the side view of FIG. 2(c), when the optical module 1 is viewed from the side of the optical fiber 5, the side surface of the cover body unit 3-1 has an opening below the extension unit 3-2 and the optical fibers 5 are pulled outside the module from the opening. As illustrated in the side view of FIG. 2(b), the optical fiber 5 is adhered by an adhesive 7 to be fixed to the lower surface of the cover extension unit 3-2. The cover extension unit 3-2 that holds and fixes the optical fibers 5 forms a part of the cover that covers the base and is integrated with the cover body unit 3-1 unlike the tubular shape of the pipe according to the technology of the related art illustrated in FIG. 1. In the optical module according to the embodiment, the cover extension unit 3-2 is formed as an extension of the upper surface of the cover body unit 3-1 and the optical fibers 5 are fixed to the top surface of the extension unit 3-2 using an elastic adhesive 7.

In FIG. 2(a), the cover including the cover body unit 3-1 and the extension unit 3-2 is detached such that the inside of the optical module can be seen. Because the optical fibers 5 are fixed to the extension unit 3-2 by the adhesive 7, the optical fibers 5 are not actually shown as in FIG. 1(a) in the state in which the cover is detached, which is illustrated to describe the configuration of the cover extension unit 3-2. Referring to two side views of FIGS. 2(b) and 2(c), it can be understood that the optical fibers 5 from which the cladding is removed are connected to the end surface of the optical waveguide chip 4 disposed to be very close to the side surface of the cover.

Referring back to FIG. 1, the optical fibers 106 pass inside the tubular pipes to hold the optical fibers in the configuration of the technology of the related art, the optical fibers are adhered and fixed inside the pipes, and further the optical fibers are hermetically sealed by a solder or the like. In the case of the structure described above, it is necessary to provide a mounting space for a mechanism that connects the optical fibers to the end surface of the optical waveguide of the optical waveguide chip inside the package with the optical fibers being passed through the pipes in advance and a work space for performing connection with good workability.

Although not described in FIG. 1, there are various specific connection methods of connecting the end surface of the optical waveguide of the optical waveguide chip to the end surfaces of the optical fibers. As an example of the connection method, there is a method of forming a V-shaped groove structure in an optical waveguide chip and making optical fibers abut against an optical waveguide along the V-shaped groove structure. As another method, an optical waveguide can also be optically coupled from the upper surface of the optical waveguide chip, and thus optical coupling forms can be adopted in accordance with various connection methods. In any connection method, it is necessary to provide a mounting space for disposing a connection structure and an attached mechanism between the optical waveguide chip and the inner wall of the package and a work space for performing mounting with good workability with the optical fibers being passed through the pipes. In addition, when the optical fibers and the optical waveguide chip are coupled by an optical lens, it is necessary to further provide a space for a structure for holding the lens inside the pipes. In the pipe structure, because it is hard to deal with a closed structure upon mounting, a distance between the chip end surface and the inner wall of the cover side surface is prevented from being shortened. As a result, it is necessary to secure 1 mm or more, preferably, about 5 mm, between the inner wall of the package and the connection end surfaces of the optical fibers.

A configuration is conceivable in which an opening is formed in a side wall portion of the package without holding the optical fiber using the pipes and the optical fibers are pulled out through the opening from the inside to the outside of the package. However, the optical fibers may be strained upon handling the optical module and thus an external force at that time has a direct influence on elements inside the package. Not having a holding mechanism of the optical fibers is not a preferable configuration from the viewpoint of reliability or a mechanical strength of the optical module.

In contrast to the technology of the related art, in the structure of the optical module according to the embodiment in FIG. 2, the mounting space inside the package is reduced as much as possible by disposing the optical waveguide chip 4 to be close to the inner wall of the cover of the package. In the package, without providing the pipes through which the optical fibers 5 pass, the cover body unit 3-1 of the package extends toward the input and output unit of the optical fibers and the optical fibers are fixed by the protruding extension unit 3-2. In the structure of the optical module according to the present invention in which the pipe structure is not used, an assembly process for the optical module is simplified in connection of the optical fibers, as will be described.

Accordingly, the optical module according to the present invention can be realized with the optical module 1 on which the optical waveguide chip 4 is mounted and which includes the optical fibers 5 coupled to the optical waveguide chip, and which is stored in the package including the base 2 on which the optical waveguide chip is mounted, and the cover including the cover body unit 3-1 that covers the entire base and the cover extension unit 3-2 that is continuously formed in a direction in which the optical fibers are pulled out from the cover body unit and the optical fibers are adhered and fixed to the surface of the cover extension unit.

Figure 3A:
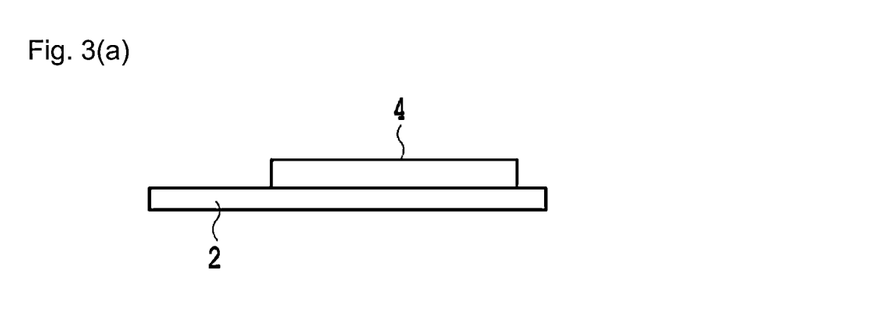
FIGS. 3(a)-3(c) are diagrams illustrating an overview of an assembly process in the optical module according to the present invention.

FIG. 3 is a diagram illustrating an overview of an assembly process in the optical module according to the present invention. As illustrated in FIG. 3(a), all the components including the optical waveguide chip 4 are first mounted on the base 2. The optical waveguide chip 4 is mounted to be close to one end of the base 2. In accordance with the function of the optical module, an electric IC or another electric component can be simultaneously mounted on the base 2.

Figure 3B:
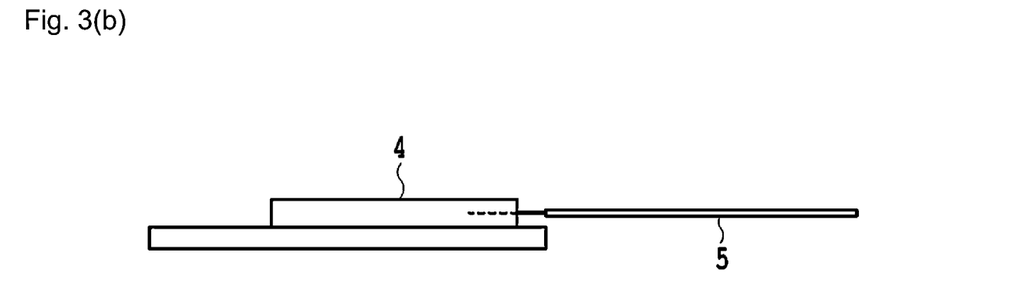

Subsequently, as illustrated in FIG. 3(b), the optical fibers 5 are connected to the end surfaces of the optical waveguide chip 4. At this time, in the optical module according to the present invention, it is not necessary for the optical fibers to pass through the tubular portions 104-1 and 104-2 of the pipes as in the optical module according to the technology of the related art illustrated in FIG. 1. In a state in which the optical fibers pass in the tubular portions of the pipes, it is not necessary to perform work for connecting the optical fibers to the end surface of the optical waveguide chip 103 in an unnatural work environment in which a positional relation with the pipe structure is limited. In the optical module in the state of FIG. 3(b), a sufficient work space can be secured around the base 2 to perform work for a process of connecting the optical fibers 5. Due to being able to temporarily fix the optical fibers 5 using an appropriate jig, it is possible to connect the end surface of the optical waveguide chip 4 to the end surfaces of the optical fibers 5 can be performed safely and with good workability. Note that, in the assembly process of the optical module according to the present invention, a stage in which the optical fibers 5 are connected to the optical waveguide chip 4 is that of a state before the cover is mounted, and it is not necessary to pass the optical fibers through the pipes.

Figure 3C:
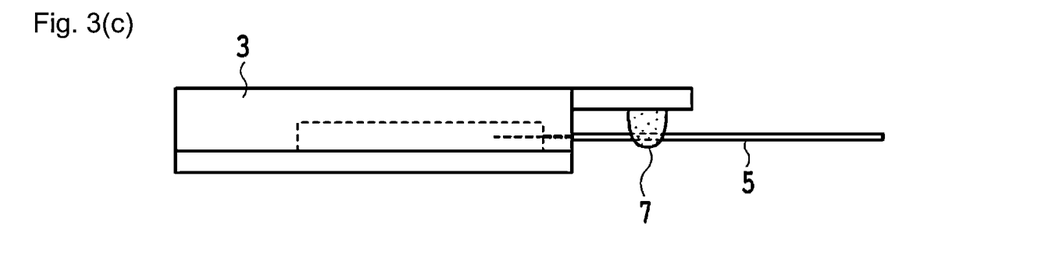

Finally, as illustrated in FIG. 3(c), the cover 3-1 is installed to cover the entire base 2 and the optical fibers 5 are fixed to the lower surface of the extension unit 3-2 of the cover 3 by the adhesive 7. Thereafter, the temporarily fixing state of the optical fibers 5 may be released. In this way, in the assembly procedure of the optical module according to the present invention, after all the elements inside the package and the optical fibers are mounted, the cover 3-1 can be installed. Therefore, the mounting can be performed in a smaller work space in the process of connecting the optical fibers, and thus significant contribution on the miniaturization of the optical module can be made. The size of the extension unit 3-2 protruding from a part of the cover in the longitudinal direction of the optical fiber has a width of 2 mm to 5 mm and a length of 3 mm to 5 mm and is preferably as small as possible in accordance with the number of optical fibers from the viewpoint of miniaturization of the entire optical module.

In the optical module according to the present embodiment, the mounting space and the work space inside the package can be reduced from those in the optical module according to the technology of the related art. The length of the package in the input and output direction of the optical fibers can be reduced to about 5 mm. Simultaneously, by simplifying the structure in which the optical fibers are held and fixed, it is possible to halve the length of the extension unit 3-2 which is a holding portion of the optical fibers from 10 mm to 5 mm, compared to a pipe structure including a structure for the holding the fibers and a structure for holding a lens according to the technology of the related art. It is possible to obtain the effect of shortening the entire optical module by about 10 mm in the input and output direction of the optical fibers. For a transceiver optical module that has an external shape of, for example, about 10 mm square in conformity with the size in the QSFP-DD standard that is very effective in terms of miniaturization.

Second Embodiment

Figure 4A:
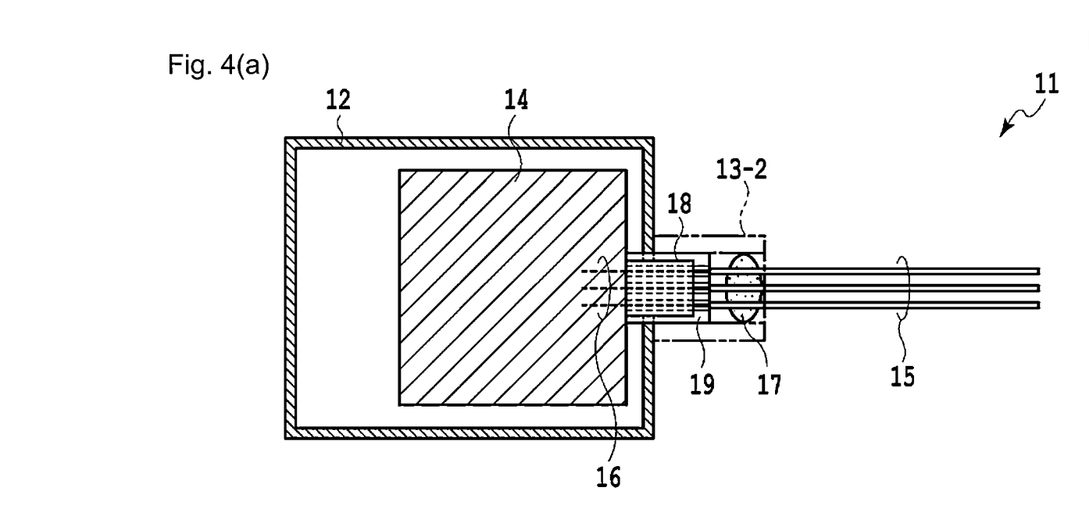
FIGS. 4(a)-4(d) are diagrams illustrating a configuration of an optical module according to a second embodiment of the present invention.
Figures 4B, 4D:
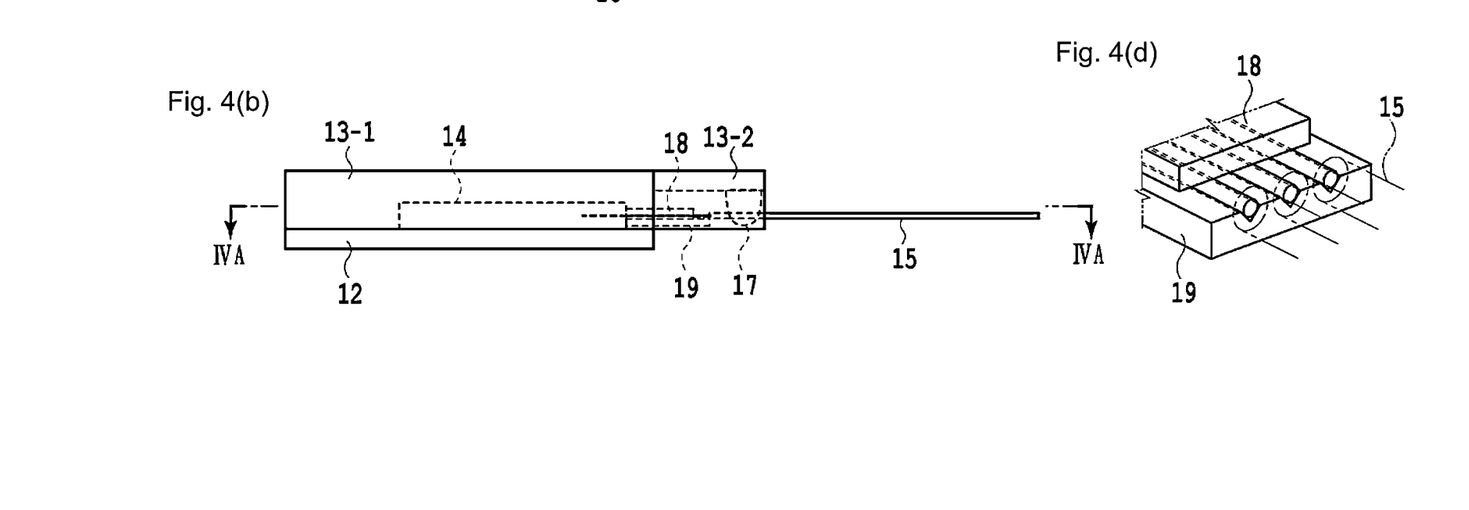
Figure 4C:
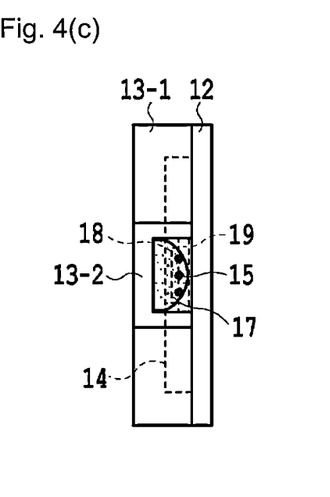

FIG. 4 is a diagram illustrating a configuration of an optical module according to a second embodiment of the present invention. FIGS. 4(a), 4(b), and 4(c) are a top view and two side views of an optical module 11. FIG. 4(a) is a top view, as viewed from above, of the inside of the optical module 11 with a cover 13-1 removed, and indicates a cross-section of the side view of FIG. 4(c) when a section immediately above an optical waveguide chip 14 is cut along line IVA-IVA. In each drawing of FIGS. 4(a) to 4(c), the structure of the optical module is illustrated without following a drawing method precisely, and for example, parts are indicated by dotted lines although the parts can be actually seen. FIG. 4(d) is an enlarged view illustrating an example of a structure of a connection unit of optical fibers to be described below.

As in the first embodiment, the optical module 11 in FIG. 4 includes optical fibers 15, an optical waveguide chip 14, and a package that contains the optical fibers 15 and the optical waveguide chip 14. In FIG. 4, elements and the like other than the optical waveguide chip 14 are simplified or omitted. The package includes a base 12 and a cover that covers the entire base. The cover includes a cover body unit 13-1 and an extension unit 13-2. The upper surface and the side surfaces of the body unit 13-1 extend toward the input and output unit of the optical fibers such that the cover extension unit 13-2 is integrated with the body unit 13-1. As illustrated in FIG. 4(c), the optical module is different from the optical module according to the first embodiment in that the cover extension unit 13-2 has side walls on both sides of an opening and cross-sections have a U shape rotated by 90 degrees. That is, the side walls of the extension unit 13-2 are formed continuously from the side walls of the cover body unit 13-1.

Referring to the enlarged view of the cover extension unit 13-2 in FIG. 4(*d*), three optical fibers 15 are fixed at an equal interval inside a glass block. It is needless to say that the number of optical fibers 15 is not limited. The glass block includes, for example, a V-shaped groove component 19 processed to form V-shaped grooves and a plate-shaped lid component 18 that disposes and fixes, in the V-shaped grooves, optical fibers of which cladding is removed and presses the optical fibers from the upper side. In the V-shaped groove component 19 and the lid component 18 of the glass block, the optical fibers can be disposed at equal intervals with high accuracy, and thus clad glass portions of the optical fibers can be protected. In the optical module according to the present embodiment, the interval of the V-shaped grooves of the V-shaped groove component 19 is designed to be equal to or less than 300 μm. A disposition pitch of the optical fibers is preferably designed such that the optical module can be miniaturized as small as possible in accordance with the clad glass appearance and the size of the external coated size. In a structure in which a plurality of fibers is fixed at an interval equal to or less than 300 μm, most optical fibers which are available in general can be fixed with good workability. When the interval is set to be equal to or less than 300 μm, it is not necessary to perform a process of bending or bundling the optical fibers in a glass block fixing unit illustrated in FIG. 4(*d*). Thus, the optical fibers can be fixed in a straight form and an optical fiber fixing unit can be minimized simultaneously.

As can be seen from FIG. 4(*b*), the optical fibers 15 fixed to the above-described glass block 18 and 19 are optically connected to the optical waveguide 16 on the end surface of the optical waveguide chip 14. The optical waveguide chip 14 is mounted on the upper surface of the base 12 included in the package. The cover body unit 13-1 is fitted to cover the entire base 12 of the package and the end surface of the optical waveguide chip 14 connected to the optical fibers 15 is disposed to be close to the inner wall of the side surface of the cover body unit 13-1 on the input and output side of the optical fibers. In the optical module 11 according to the present embodiment, a distance between the cover inner wall and the end surface of the optical waveguide chip 14 can be set to be equal to or less than 0.5 mm and is preferably set in the range of 0.1 mm to 0.5 mm from the viewpoint of miniaturization of the optical module.

In the glass block illustrated in FIG. 4(*d*), the V-shaped groove component 19 is located on the lower side and the lid component 18 is located on the upper side in the glass block as an example. However, the components may be upside down and the optical fibers may be connected to the optical waveguide chip 14. In the foregoing description, a structure in which the optical waveguide (an optical waveguide surface) is formed on the upper surface of the optical waveguide chip is assumed. However, flip-chip mounting which is also widely used in an electric IC may be used to mount a waveguide surface on the lower side. In this case, it is preferable to reverse the upper and lower relation of the components 18 and 19 of the glass block.

The cover of the optical module 11 includes a cover extension unit 13-2 integrated with the cover body unit 13-1 in addition to the cover body unit 13-1 that has a rectangular upper surface corresponding to the bottom surface of the optical module, that is, the base 12. The upper surface and the side surfaces of the body unit 13-1 each extend and the cover extension unit 13-2 is formed by three surfaces (the top surface and two side surfaces) protruding from the side surfaces on the input and output side of the optical fibers of the cover body unit 13-1. The cover extension unit 13-2 forms a small space for holding and fixing the optical fibers 15 via an opening on the side surface of the cover body unit continuously from an internal space formed by the body unit 13-1. The extension unit 13-2 has a sideways U-shaped cross-section shape when the side surface of the optical module 11 is viewed from the side of the optical fibers 15 as in FIG. 4(*c*). As illustrated in FIGS. 4(*a*) to 4(*c*), it can be understood that the cover of the optical module is formed such that the cover body unit 13-1 and the extension unit 13-2 are integrated. As illustrated in the side view of FIG. 4(*c*), the side surface of the cover body unit 13-1 has an opening in the extension unit 13-2 and the optical fibers 15 are pulled outside the optical module via the opening. As illustrated in the side view of FIG. 4(*b*), the optical fibers 15 are adhered and fixed by an adhesive 17 to the lower surface side of the surface (the top surface) extending from the upper surface of the cover body unit 13-1 among three surfaces (the top surface and two side surfaces) of the substantially U-shaped extension unit 13-2.

Because of the substantially U-shaped extension unit 13-2 that has the three surfaces, damage of the optical fibers 15 can be avoided, for example, when the optical module is mounted on a main substrate of a device for mounting the optical module 11 on the device. The held and fixed portions of the optical fibers are protected by the substantially U-shaped cover extension unit 13-2, and thus it is possible to avoid damage of the optical fibers from the upper surface and both sides of the optical module which are easily hit by a tool or a hand of a worker. Because the entire units 13-1 and 13-2 of the cover are opened toward the lower side, the assembly process for the optical module illustrated in FIG. 3 in the first embodiment can be applied without being changed. As in the optical module according to the first embodiment, the mounting space and the work space can be minimized, the workability during manufacturing is good, damage of the fibers can be prevented, and thus it is possible to realize the miniaturized optical module with high reliability.

In FIG. 4, the optical fibers 15 are fixed to only the top surface of the extension unit 13-2, but as much elastic adhesive as possible is inserted in the extension unit 13-2 such that the optical fibers 15 can be protected. By arranging the elastic adhesive in the front end of the extension unit 13-2, it is possible to prevent pulling disconnection caused due to bending of the optical fibers 15 in any of the upper, lower, right, and left directions, protect the optical fibers 15, and thus realize the optical module with high reliability.

In the optical module according to the above-described first embodiment, the cover extension unit 3-2 is a plate-shaped protrusion continuously formed in the direction in which the optical fibers 5 are pulled out from the upper surface of the cover body unit 3-1, and the optical fibers are pulled out toward the protrusion from the opening opened from the inside of the package.

In the optical module according to the above-described second embodiment, the cover extension unit 13-2 is a substantially U-shaped protrusion formed by three surfaces continuously formed from the upper surface of the cover body unit 13-1 and the side surfaces from which the optical fibers are pulled out, and the optical fibers are pulled out from the opening opened toward the protrusion from the inside of the package.

As a modification of the optical module according to the second embodiment, the cover extension unit may be at least one plate-shaped protrusion continuously formed from the side surface of the cover body unit from which the optical fibers are pulled out, and the optical fibers may be pulled out from the opening opened toward the protrusion from the inside of the package. That is, even when the cover extension unit 13-2 has one of the side surfaces or only two side surfaces in the configuration of FIG. 4, the mounting space and the work space can be minimized as in the first and second embodiments by correcting a method of adhering the optical fibers. Workability is good in manufacturing, damage of the fibers can be prevented, and thus it is possible to realize the miniaturized optical module with high reliability.

Third Embodiment

Figure 5A:
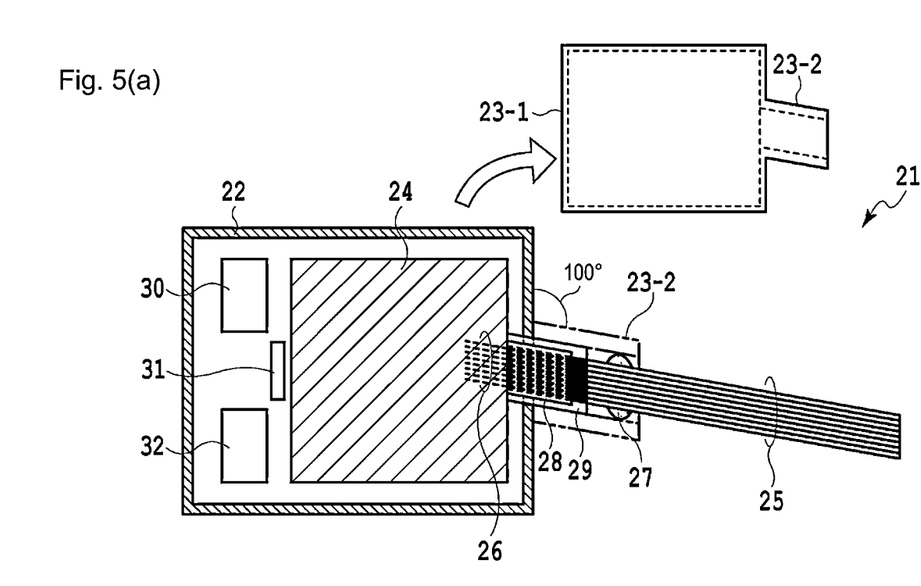
FIGS. 5(a)-5(c) are diagrams illustrating a configuration of an optical module according to a third embodiment of the present invention.
Figure 5B:
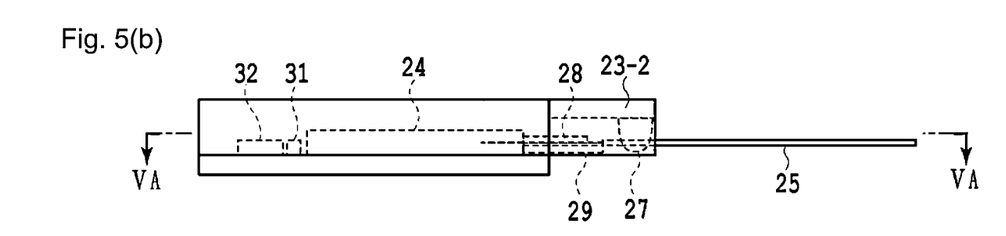
Figure 5C:
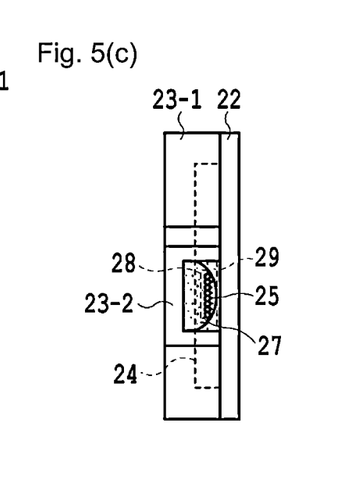

FIG. 5 is a diagram illustrating a configuration of an optical module according to a third embodiment of the present invention. The present embodiment proposes a configuration example in which the optical module has a more specific function and a mounting state on a device is considered. FIGS. 5(a), 5(b), and 5(c) are a top view and two side views of an optical module 21. FIG. 5(a) is a top view, as viewed from above, of the optical module 1 with a cover 23-1 removed, and indicates a cross-section of the side view of FIG. 5(c) when a section immediately above an optical waveguide chip 24 is cut along line VA-VA. In each drawing of FIGS. 5(a) to 5(c), the structure of the optical module is illustrated without following a drawing method precisely, and for example, parts are indicated by dotted lines although the parts can be actually seen.

As in the first and second embodiments, the optical module 21 in FIG. 5 includes an optical fiber 25, an optical waveguide chip 24, and a package that stores the optical fibers 25 and the optical waveguide chip 24. The optical module 21 further includes other chips 30 to 32 in addition to the optical waveguide chip 24, as will be described below. The package of the optical module 21 includes a base 22 and a cover, and the cover includes a cover body unit 23-1 and a cover extension unit 23-2. The upper surface and the side surfaces of the body unit 23-1 extend toward the input and output unit of the optical fibers such that the cover extension unit 23-2 is integrated with the body unit 23-1. As in the second embodiment, as illustrated in FIG. 5(c), the extension unit 23-2 has three surfaces that have side walls on both sides of an opening, and the cross-sections have a sideways U shape that is a shape rotating a U shape by 90 degrees. A difference from the second embodiment is that the extension unit 23-2 does not protrude vertically from the side surface of the body unit 23-1 and the extension unit 23-2 is formed inclined more slightly (for example, 110 degrees) than the vertical direction from the side surface of the body unit 23-1 when the upper surface of the body unit 23-1 is viewed. Hereinafter, a configuration of the optical module 21 different from the optical module of the second embodiment will be mainly described.

In the optical waveguide chip 24 in FIG. 5, a function of an optical modulator using an electrooptic effect or an electroabsorption effect and a photodiode receiving an optical signal are integrated. In the optical module 21, a transmission laser 31, a driver amplifier 30 driving the modulator, and a transimpedance amplifier 32 amplifying a photoelectrically converted-optical current of the photodiode are further mounted on the base 22. Although not illustrated in FIG. 5, the base 22 of the package include an electric wiring and an electric terminal connecting control signals and high frequency signals for the driver amplifier 30 and the transimpedance amplifier 32 to the outside of the optical module. The shape of the electric terminal is one of a surface mounting electrode, a flexible printed circuit (FPC) type electrode, and a ball grid array (BGA) type electrode. In the optical module 21 illustrated in FIG. 5, the driver amplifier 30 and the transimpedance amplifier 32 are mounted in a separate package by a different material from the optical waveguide chip 24 as an example. However, even when the two amplifiers 30 and 32 are manufactured with the same material as the optical waveguide chip 24 as a monolithic configuration integrated in a single chip, the mounting structure of an optical fiber connection portion is the same. Even when an integration aspect of the optical module function is different, it is possible to obtain the same miniaturization effect as the optical module of the extension unit 23-2 integrated with the cover body unit 23-1 in the optical module according to the present invention.

In the optical module according to the present embodiment, the number of channels of modulation signals in a transmission unit is set to four and the number of channels for optical signals received in a reception unit is also set to four. Accordingly, the total number of optical fibers 25 connected to the optical waveguide 26 of the optical waveguide chip 24 is eight for transmission and reception. The number of optical fibers conforms with an Ethernet optical transceiver instituted by the American standardization group, the Institute of electrical and Electronics Engineers (IEEE) Inc. The number of wavelength division multiplexing (LAN-WDN: Wavelength Division Multiplexing dedicated for LAN and CWDM: Coarse Wavelength Division Multiplexing) of an optical signal defined in 100 GbE (100 Gigabit Ethernet (registered trademark)) which is a standard specification of an Ethernet optical transceiver is referred to. The above-described number of optical fibers is exemplary in the case of the optical transceiver according to the present embodiment and the present invention is not limited to eight.

As in the optical module 21 in FIG. 5 according to the present embodiment, a digital optical coherent optical transceiver module can be formed by integrating an optical modulator and an optical receiver in the optical waveguide chip 24 and further integrating an optical hybrid circuit. In the case of the optical transceiver module, the number of optical fibers optically connected to the outside of the module is three or four.

In the optical module 21 according to the present embodiment, as in the second embodiment, the eight optical fibers 25 are fixed at the equal interval in glass blocks 28 and 29 and are optically connected to the end surfaces of the optical waveguide of the optical waveguide chip 24. The optical waveguide chip 24 is mounted on the upper surface of the base 22 along with the other chips 30 to 32. The cover body unit 23-1 covering the entire base is mounted on the upper surface of the base 22 of the package. An end surface of the optical waveguide chip 24 connected to the optical fibers is disposed to be close to the inner wall of the side surface of the cover body unit 23-1 on the input and output side of the optical fibers. In the present embodiment, a distance between the inner wall of the side surface of the cover body unit 23-1 and the end surface of the optical waveguide chip 24 is set to be equal to or less than 0.5 mm. From the viewpoint of miniaturization of the optical module, the distance between the inner wall of the cover body unit and the end surface of the optical waveguide chip is preferably set in the range of 0.1 mm to 0.5 mm.

The cover includes a cover extension unit 23-2 integrated with the cover body unit 23-1 in addition to the cover body unit 23-1 that has a rectangular upper surface corresponding to the bottom surface of the optical module 21, that is, the base 22. The upper surface and the side surfaces of the cover body unit 23-1 each extend and the cover extension unit 23-2 is formed by three surfaces (the top surface and two side surfaces) protruding from the input and output side of the optical fibers of the cover body unit 23-1. The extension unit 23-2 forms a small space for holding and fixing the optical fibers 25 via an opening on the side surface of the body unit 23-1 continuously from an internal space formed by the body unit 23-1. The extension unit 23-2 has a cross-section shape of a sideways U shape when the side surface of the optical module 21 is viewed from the side of the optical fibers 25 as in FIG. 5(c). As illustrated in FIGS. 5(a) to 5(c), the cover of the optical module 21 is formed such that the cover body unit 23-1 and the extension unit 23-2 are integrated. As illustrated in the side view of FIG. 5(c), the side surface of the cover body unit 23-1 has an opening in a space of three surfaces of the extension unit 23-2 and the optical fibers 25 are pulled outside the module via the opening. As illustrated in the side view of FIG. 5(b), the optical fibers 25 are adhered and fixed by an adhesive 27 to the lower surface side of the surface (the top surface) extending from the upper surface of the cover body unit 23-1 among three surfaces (the top surface and two side surfaces) of the substantially U-shaped extension unit 23-2.

A difference between the optical module 21 according to the embodiment and the optical module 11 according to the second embodiment is that the extension unit 23-2 is not vertical to the cover body unit 23-1 and is inclined. Accordingly, the optical fibers 25 are mounted on the end surface of the optical waveguide chip 24 at an inclined angle with respect to the side surface of the optical module. For example, when viewed from the upper surface of the body unit 23-1 in FIG. 5(a), the extension unit 23-2 is inclined at 20 degrees in the vertical direction with respect to the side surface of the body unit 23-1 and an inclination direction is oriented at an angle of 110 degrees.

Because of the substantially U-shaped extension unit 23-2 that has the three surfaces, damage of the optical fibers 25 can be avoided when the optical module 21 is mounted on the device as in the second embodiment. Because the entire units 23-1 and 23-2 of the cover are opened toward the lower side, the assembly process for the optical module illustrated in FIG. 3 in the first embodiment can be applied without being changed. Accordingly, as in the first and second embodiments, the mounting space and the work space can be minimized, the workability during manufacturing is good, damage of the fibers can be prevented, and thus it is possible to realize the miniaturized optical module with high reliability.

The optical module 21 according to the embodiment is not vertical to the side surface of the package and the optical fibers 25 are pulled out at an inclination of a maximum angle of 110 degrees. The configuration has the advantage of routing the optical fibers in a minimum area on the device such as an optical transceiver on which the optical module is mounted. That is, when the direction of the optical fibers 25 of the optical module is inclined on the substrate of the optical transceiver such that a general layout relation with another component to which the optical fibers 25 are connected is appropriate, it is possible to route the optical fibers 25 efficiently. The extension unit 23-2 and the optical fibers may be formed such that a layout configuration of a specific transceiver is appropriate, and the optical fibers are inclined and pulled out in any direction.

Figure 6A:
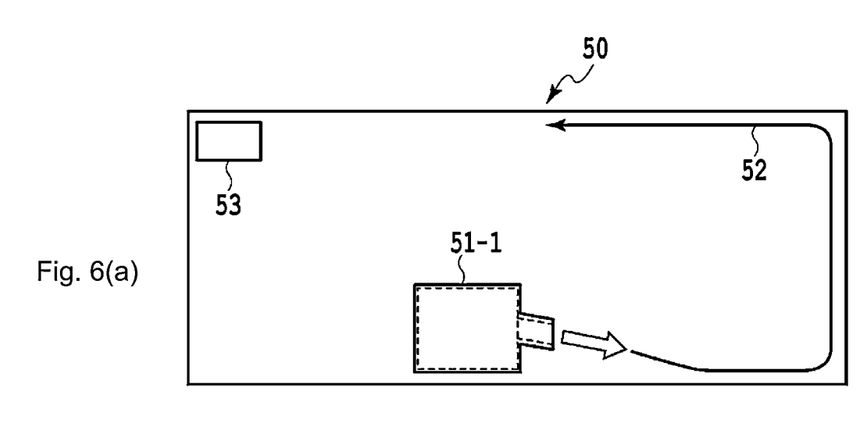
FIGS. 6(a) and 6(b) are diagrams illustrating a disposition example of an optical module on a transceiver substrate.
Figure 6B:
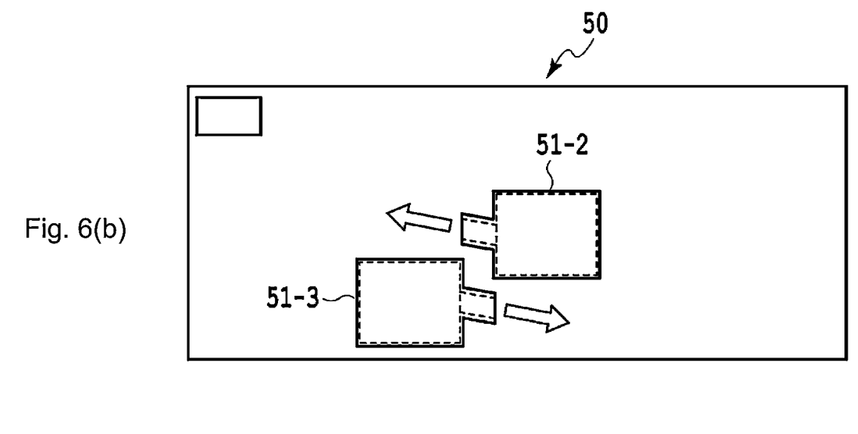

FIG. 6 is a diagram illustrating a disposition example of an optical module on a transceiver substrate. FIGS. 6(a) to 6(b) are both top views illustrating a printed substrate 50 of a transceiver on which the optical modules 51-1 to 51-3 according to the third embodiment are mounted. Other electric components or electric ICs are omitted and only the optical modules 51-1 to 51-3 are illustrated. For example, it is assumed that a layout of the optical module 21 on the device is in a peripheral portion of the device substrate and optical components (for example, optical connectors or other optical modules) of a connection destination are in the middle of the device substrate. In this case, by using the optical module in which the extension unit 23-2 is inclined in a direction on the inner side of the device substrate, the optical fibers 25 are routed immediately toward the optical components of the connection destination.

As illustrated in FIG. 6(a), the optical fibers 52 can be routed toward the inner wall of the optical transceiver at a curve less than the optical fibers 52 in the configuration of the optical module 51-1 on which the optical fibers are inclined and mounted. Therefore, it is possible to contribute to realization of a small optical transceiver. The optical fibers 52 are routed to, for example, an optical connector 53 of the device and the optical module 51-1 and is routed immediately along the peripheral portion of the substrate 50, that is, the inner wall of the optical transceiver.

As in FIG. 6(b), even when there are two different optical modules 51-2 and 51-3, the two optical modules can be laid out to be very close to each other by disposing the extension units 23-2 to face each other. The configuration in which the optical fibers 25 are mounted at an inclination from the side surface of the package of the optical module can also contribute to realization of a miniaturized transceiver.

An angle at which the optical fibers are mounted on the side surface of the package is preferably equal to or greater than 95 degrees and equal to or less than 105 degrees. This is because when the angle exceeds 110 degrees, it is difficult to mount the optical fibers and there is a possibility of mounting accuracy and reliability of the optical module deteriorating.

Further, when the angle at which the optical fibers 25 are mounted is formed in the optical module 21 illustrated in FIG. 5, reflected light occurring between the optical fibers 25 and the optical waveguide 26 is inhibited from directly coupling with the optical fibers or the optical waveguide and propagating. In the configuration of the optical module 21 illustrated in FIG. 5, it is also possible to secure an attenuation amount of the reflected light which is one performance index of an optical device.

It is needless to say that the configuration of the third embodiment in which the optical fibers are inclined and mounted on the side surface of the optical module can be applied similarly to the first embodiment in which the plate-shaped cover extension unit extends from only the upper surface of the cover body unit.

In any of the above-described embodiments, the upper surfaces inside the cover body units 3-1, 13-1, and 23-1 are slightly distant from the optical waveguide chips 4, 14, and 24 (see FIGS. 2, 4, and 5), as described above. However, the upper surface of the optical waveguide chip and the inner surface of the cover body unit may be formed to be close for electrical contact or heat dissipation of the optical waveguide chip. In any embodiment, the plate-shaped bases 2, 12, and 22 have been described, but the height inside the base may be high except for the peripheral portion or the base may have a side surface on the periphery.

As described above, the internal mounting space and the work space can be reduced in the optical module according to the present invention, and thus the optical module can be further miniaturized because of the simplified holding structure of the optical fiber. It is very effective to realize an optical device with higher integration and it is possible to make considerable contribution to development of a large-capacity optical communication network in which it is necessary to control various optical signals.

INDUSTRIAL APPLICABILITY

The present invention can be used for a communication system. In particular, the present invention can be used for an optical module of an optical communication system.

REFERENCE SIGNS LIST 1, 11, 21, 51-1 to 51-3100 Optical module
2, 12, 22, 101 Base
3-1, 13-1, 23-1 Cover body unit
3-2, 13-2, 23-2 Cover extension unit
4, 14, 24, 103 Optical waveguide chip
5, 15, 25, 52, 106 Optical fiber
7, 17, 27, 108 Adhesive
6, 16, 26, 107 Optical waveguide
18, 28 Lid component
19, 29 V-shaped groove component
30 Driver amplifier
31 Laser
32 Transimpedance amplifier
50 Substrate
53 Optical connector
102 Cover
104-1, 104-2 Pipe

The invention claimed is:

1. An optical module on which an optical waveguide chip is mounted and which includes an optical fiber coupled to the optical waveguide chip, the optical module being stored in a package including:
   a base on which the optical waveguide chip is mounted, and
   a cover, the cover including:
      a cover body unit that covers the entire base, and
      a cover extension unit having a first surface that that is level with a top surface of the cover body that is opposite to the base and a second surface that is lower than the first surface and higher than the base, the cover extension unit extending out from the top surface of the cover body that is opposite to the base so as to be continuously formed in a direction in which the optical fiber is pulled out from the cover body unit, a gap being formed below the second surface of the cover unit, an adhesive extending from the second surface of the cover extension unit into the gap such that the optical fiber is adhered and fixed to the second surface of the cover extension unit via the adhesive extending from the second surface of the cover extension unit into the gap.

2. The optical module according to claim 1, wherein the optical waveguide chip is mounted on the base such that an end surface of an optical waveguide connected to the optical fiber is close to an inner wall of a side surface of the package.

3. The optical module according to claim 1, wherein the cover extension unit is a plate-shaped protrusion continuously formed in a direction in which the optical fiber is pulled out from an upper surface of the cover body unit, and the optical fiber is pulled out from an opening opened toward the protrusion from an inside of the package.

4. The optical module according to claim 1, wherein the cover extension unit is a substantially U-shaped protrusion formed by three surfaces continuously formed from an upper surface of the cover body unit and a side surface from which the optical fiber is pulled out, and the optical fiber is pulled out from an opening opened toward the protrusion from an inside of the package.

5. The optical module according to claim 1, wherein the cover extension unit is at least one plate-shaped protrusion continuously formed from a side surface of the cover body unit from which the optical fiber is pulled out, and the optical fiber is pulled out from an opening opened toward the protrusion from an inside of the package.

6. The optical module according to claim 1, wherein the optical fiber is connected such that a mounting angle is equal to or greater than 95 degrees and equal to or less than 105 degrees with respect to a side surface pulled out from the package.

7. The optical module according to claim 1, wherein the optical fiber is fixed inside a glass block and is connected to an end surface of the optical waveguide of the optical waveguide chip, and the glass block is covered by the cover.

8. The optical module according to claim 1, wherein the optical module is an optical transceiver module in which an optical transmitter and an optical receiver are integrated, and the number of optical fibers is three to eight.

* * * * *